United States Patent
Webb et al.

(10) Patent No.: US 7,379,223 B2
(45) Date of Patent: May 27, 2008

(54) MODULATOR CONTROL SYSTEM

(75) Inventors: Stephen M. Webb, Kent (GB);
Richard Oberland, Eltham (GB)

(73) Assignee: Xtera Communications Ltd., Essex (GB)

( * ) Notice: Subject to any disclaimer, the term of this patent is extended or adjusted under 35 U.S.C. 154(b) by 0 days.

(21) Appl. No.: 10/545,666

(22) PCT Filed: Feb. 16, 2004

(86) PCT No.: PCT/GB2004/000606

§ 371 (c)(1),
(2), (4) Date: Jun. 6, 2006

(87) PCT Pub. No.: WO2004/072715

PCT Pub. Date: Aug. 26, 2004

(65) Prior Publication Data

US 2006/0227401 A1    Oct. 12, 2006

(30) Foreign Application Priority Data

Feb. 15, 2003    (GB) ................. 0303564.9

(51) Int. Cl.
*G02B 1/03*    (2006.01)
(52) U.S. Cl. ............... 359/245; 359/238; 359/239
(58) Field of Classification Search .......... 359/245, 359/238, 239
See application file for complete search history.

(56) References Cited

U.S. PATENT DOCUMENTS

| 6,374,000 | B1 * | 4/2002 | Olesen .................. 385/2 |
| 6,473,219 | B1 | 10/2002 | King |
| 2002/0075550 | A1 | 6/2002 | Olesen |
| 2002/0114047 | A1 | 8/2002 | McBrien et al. |
| 2002/0171903 | A1 | 11/2002 | Walklin |
| 2003/0007231 | A1 | 1/2003 | Winzer |

* cited by examiner

*Primary Examiner*—Timothy J. Thompson
(74) *Attorney, Agent, or Firm*—Dickstein Shapiro LLP

(57) ABSTRACT

An optical communications system comprising: an optical input and an output, a source of input signals in an asymmetric format and having a duty cycle, a modulator for modulating the input signals, to produce an asymmetric signal, the modulator comprising a Mach-Zehnder interferometer; drive means for driving the modulator at a predetermined modulator drive voltage; bias means for applying a bias voltage to the modulator; adjustment means for adjusting a first variable chosen from one of the bias voltage, gain voltage, or duty cycle in response to the relationship existing between changes in the amplitude of the asymmetric signal and changes in the first variable, characterized in that the system further comprising varying means for varying a second variable, different to the first variable and chosen from one of the bias voltage, gain voltage or duty cycle in response to adjustments made to the first variable; and a monitor for recording the average optical output power.

10 Claims, 20 Drawing Sheets

MODULATOR CONTROL SYSTEM

This invention relates to the control of an optical modulator and particularly, but not exclusively, to a modulator for generating a "return to zero" (RZ) output signal in a communications system. The invention also relates to an optical communications system comprising such a modulator.

It is known that an interferometer such as a Mach-Zehnder interferometer also known as a Mach-Zehnder modulator (MZM) can be used to modulate optical signals. Such modulators are usually constructed by forming optical waveguide structures on an electro-optic material such as Lithium Niobate or Indium Phosphide. By driving the modulator with a RZ signal, a optical RZ signal will be generated as depicted in FIG. 1.

FIG. 16 shows a measured data eye representation with the desired pulse shape and extinction ratio for an RZ signal. The extinction ratio in a signal comprising data 1's and 0's is defined as the ratio of the optical power level in the '1's to optical power level in the '0's. However, Mach-Zehnder modulators exhibit a temperature and time instability, and require frequent re-adjustment of modulator parameters in order to maintain optimum performance on a transmission system. Such parameters are modulator drive voltage and modulator bias voltage, and adjustment of these will affect the optical extinction ratio, RZ pulse shape, and overall system transmission performance.

Due to the characteristics of a Mach-Zehnder modulator shown schematically in FIG. 2, it is important to apply an optimum bias voltage to the modulator to ensure that an RZ signal is output with the optimum pulse shape and maximum extinction ratio. However, the required bias voltage varies throughout the operational life, and with temperature of the modulator. Typically an automatic control loop is required to adjust the drive parameters. However conventional control strategies have not been applied successfully to this scheme of modulation (typically a control loop samples the output from the modulator by a monitor photodiode). In addition it has only recently been possible to generate an electrical RZ signal of sufficient quality at typical required data rates.

The Mach-Zehnder modulator may be used for example in an optical transmission system as shown in FIG. 4. The transmission system disclosed in FIG. 4 is designated generally by the reference numeral 150. The system comprises a transmitter 152 and a receiver 154. At intervals along the transmission system, the system comprises optical amplifiers 156 for amplifying the signal transmitted by the system 150.

An alternative optical method is conventionally used to generate an RZ signal. An RZ signal may be produced optically by using a Mach-Zehnder modulator driven by a non return to zero (NRZ) signal. A clock signal is then applied to a second MZM which gates the NRZ data to produce a resulting optical RZ signal as depicted in FIG. 5. A monitor photodiode at the output forms part of the modulator.

Such a system, although stable when using conventional control loops (using feedback from the monitor photodiode), is expensive, having a large number of components. In addition, the ability to produce a varied pulse shape is limited.

It is known that when appropriate bias voltage is applied to the MZM, the signal produced will be a true RZ signal with a zero value signal coinciding with true zero (i.e maximum extinction ratio). (See FIG. 6).

If the applied bias voltage is too high, a zero value signal will have a positive value (see FIG. 7), and if the applied bias voltage is too low, a zero value signal will also have a positive value (see FIG. 8).

To control the modulator bias in order that the signal produced is a true RZ signal, it is possible to add a dither voltage onto the bias voltage so that the bias voltage varies about the mean bias voltage as shown in FIG. 9. A control system may then sample the average output power from the modulator and decide if the bias voltage is too high or too low by comparing the phase of the detected dither in the optical signal to that which is added to the bias voltage.

In a typical implementation it is preferred to use a micro-processor to perform this control function where the processor is interfaced to a monitor photodiode by an analogue to digital converter and the bias voltage by a digital to analogue converter. The monitor photo-diode is preferably followed by an electrical low pass or bandpass filter with a cut-off frequency that preferably allows passage of the detected dither signal. The filter may also be implemented by digital means using digital signal processing (DSP) within a software algorithm. It is possible to realise a control system using a purely analogue approach. However it is generally more complicated and less flexible to implement it.

The control algorithm works as follows:

If the mean bias voltage is too high, a square waveform detected on the monitor photodiode will be output from the MZM, the shape of which corresponds to the shape of the dither voltage (see FIG. 10).

If the mean bias voltage is too low, the output waveform will again be a square wave. However the waveform detected by the monitor photodiode will vary inversely with the bias voltage (FIG. 11).

Finally, if the mean bias voltage is at an optimum level, the mean optical power at the output of the MZM will be approximately unchanged (FIG. 12).

Note that the dither voltage has thus far been assumed to be a square wave signal. However the algorithm will also work with any arbitary shape of dither signal such as for example sinusoidal or triangular.

The use of a Mach-Zehnder modulator in an optical communications system has hitherto resulted in an output signal which has a controlled bias voltage under the effects of component drift. However it is found that the optical extinction ratio is typically no better than 10 dB (see FIG. 14). This is because the known algorithm described herein above obtains its feedback from the average optical power, and is confused by changes in the one level, when it should be directed only to the zero level. Under such circumstances, if the bias voltage is adjusted manually it is possible to obtain higher optical extinction ratios of typically 16 dB. This shows therefore that the control loop is not at an optimum level when adjusted by the known algorithim.

It is believed that the flaw in the algorithm is due to the fact that the return to zero signal is typically sinusoidal in shape, and pseudo-random with an equal average number of data ones and data zeros, leading to 25% of the time being associated with the 1 level signals, and 75% of the time being associated with the 0 levels signals. With respect to the average optical power, changes in the bias voltage therefore bring about a change in light level which results mainly from the zero signal increasing and decreasing in level. However, 25% of the one level signal also increases and decreases in level.

According to a first aspect of the present invention there is provided an optical communications system comprising:

an optical input and an output, a source of input signals in an asymmetric format and having a duty cycle, a modulator for modulating the input signals, to produce an asymmetric signal, the modulator comprising a Mach-Zehnder interferometer;

drive means for driving the modulator at a predetermined modulator drive voltage;

bias means for applying a bias voltage to the modulator;

fluctuating means for fluctuating the bias voltage;

adjustment means for adjusting a first variable chosen from one of: the bias voltage; gain voltage; or duty cycle, in response to the relationship existing between changes in the amplitude of the asymmetric signal and changes in the first variable, the system further comprising varying means for varying a second variable, different to the first variable and chosen from one of: the bias voltage; gain voltage; or duty cycle, in response to adjustments made to the first variable, and a monitor for recording the average optical output power.

Preferably the first variable comprises the bias voltage, and the second variable comprises the gain voltage. However, further combinations of the three variables, bias voltage, gain voltage or duty cycle may be used.

The inventors have realised that by varying two out of three of these variables, a more efficient communication system results.

Preferably the asymmetric signal is an RZ signal, although it could also be a return to one signal, for example.

It has been realised by the inventors that Mach Zehnder modulators have a sinusoidal transfer function of optical power to applied voltage (see FIG. 3). Conventionally a symmetrical electrical signal e.g. square wave, sine wave, or NRZ data of equal '1' to '0' bit ratio, is fed into the modulator at the optimum bias point (half power point (FIG. 3)). The subsequent modulator control system is then balanced. If for example, the bias voltage is decreased from the optimum position then the integrated power loss in the '1' level and the integrated power gain in the '0' level are equal.

However for asymmetrical signals e.g. RZ pulse shapes or data streams with unequal '1' to '0' bit ratios the balanced bias position is different. For typical RZ data patterns the total integrated power from '1's occurs 25% of the total time (50% of a bit period, 50% of the time). The balanced bias position occurs for a positive '0' light level, giving a non-optimal extinction ratio. If the bias voltage is decreased from the optimum position (see FIG. 3) then the integrated power loss in the '1' level and the integrated power gain in the '0' level are unequal.

The inventors have realised therefore that more accurate control of the bias voltage may be achieved by adjusting the level of the modulator drive voltage when the bias voltage is adjusted. More specifically, when the bias voltage is increased, the modulator drive voltage is decreased to maintain the one level signal substantially constant. Similarly when the bias voltage is decreased the modulator drive voltage is increased to maintain the one level signal substantially constant.

This means that the average light level change is now balanced about the optimum bias position. This is achieved by adding a gain compensation dither to the data drive level applied to the modulator. The amount of gain compensation is calibrated at the start of the life of the modulator. It is tuned manually to achieve the best extinction ratio. Typically this gain dither amplitude will be determined during a set-up procedure.

The input signals are in the form of data transmitted through the communication system.

The drive means comprises an electrical driver amplifier suitable for RZ data. The output drive level is controlled by a gain control voltage on the amplifier.

Preferably, the optical source comprises a laser.

Conveniently the bias means comprises a voltage source such as a digital to analogue convertor in a digital implementation, or an operational amplifier in an analogue implementation.

Conveniently, when the first variable comprises the bias voltage the adjustment means comprises a first dither for applying a dither to the bias voltage. The dither causes the bias voltage to fluctuate by a predetermined amount about a predetermined mean value. The dither may be any arbitrary waveform although a square wave is typically preferred.

Preferably, the varying means comprises a second dither for applying a dither to the modulator drive voltage.

By varying the drive level and bias to the MZM and re-adjusting the gain dither amplitude, it is possible to change the optical pulse shape. A higher drive level and bias will give a wider pulse, and a lower drive and bias will give a narrower pulse.

A dithered control loop steps variables that are a function of another variable. The control loop changes these parameters to reach a target value of the function. Typically a target value of the function is one that doesn't vary much when the variables are dithered.

To date, most dither type control loops have been one dimensional with respect to time. That is, a single variable is dithered to see its effect on the monitoring function. For a modulator control loop, two variables are often available that are a function of the mean optical power. The two parameters are modulator drive (or gain) level, and modulator bias voltage.

$$\text{Mean optical power} = f(\text{drive, bias})$$

For an NRZ data source, the mean optical power function obeys a simple function of drive level and a simple function of bias voltage. The drive level is dithered and the mean power monitored to feedback a modulator bias set point. The minimum change in optical power for a dithered drive level occurs at the optimum bias point only.

For an RZ data source, the mean optical power is a more complex function of drive level and bias voltage.

The minimum change in optical power with a dithered drive level occurs for many bias points away from the optimum.

By applying a two dimension dither routine with respect to time, more suitable target values of the function become available. By dithering drive level and bias voltage synchronously, the minimum change in optical power occurs at different points. Using the correct dither size ratio for the two variables the minimum change in optical power can be tailored to occur at the optimum bias point only, as for NRZ data signals.

According to a second aspect of the present invention there is provided a method of transmitting an optical signal in asymmetric format, the method comprising modulating an input signal having an asymmetric format and a duty cycle using a Mach-Zehnder modulator (MZM);

applying a predetermined modular drive voltage to the MZM;

applying a bias voltage to the MZM;

adjusting a first variable chosen from one of: the bias voltage; gain voltage; or duty cycle, in response to the relationship existing between changes in the amplitude of the asymmetric signal and changes in the first variable;

varying a second variable, different to the first variable and chosen from one of: the bias voltage; gain voltage; or duty cycle, in response to adjustments made to the first variable;

monitoring the average optical power output of the Mach-Zehnder modulator.

According to a third aspect of the present invention there is provided a modulator comprising a Mach-Zehnder interferometer, which modulator produces asymmetric signals in an optical communication system.

The invention will now be further described by way of example only with reference to the accompanying drawings in which.

Figure 14:
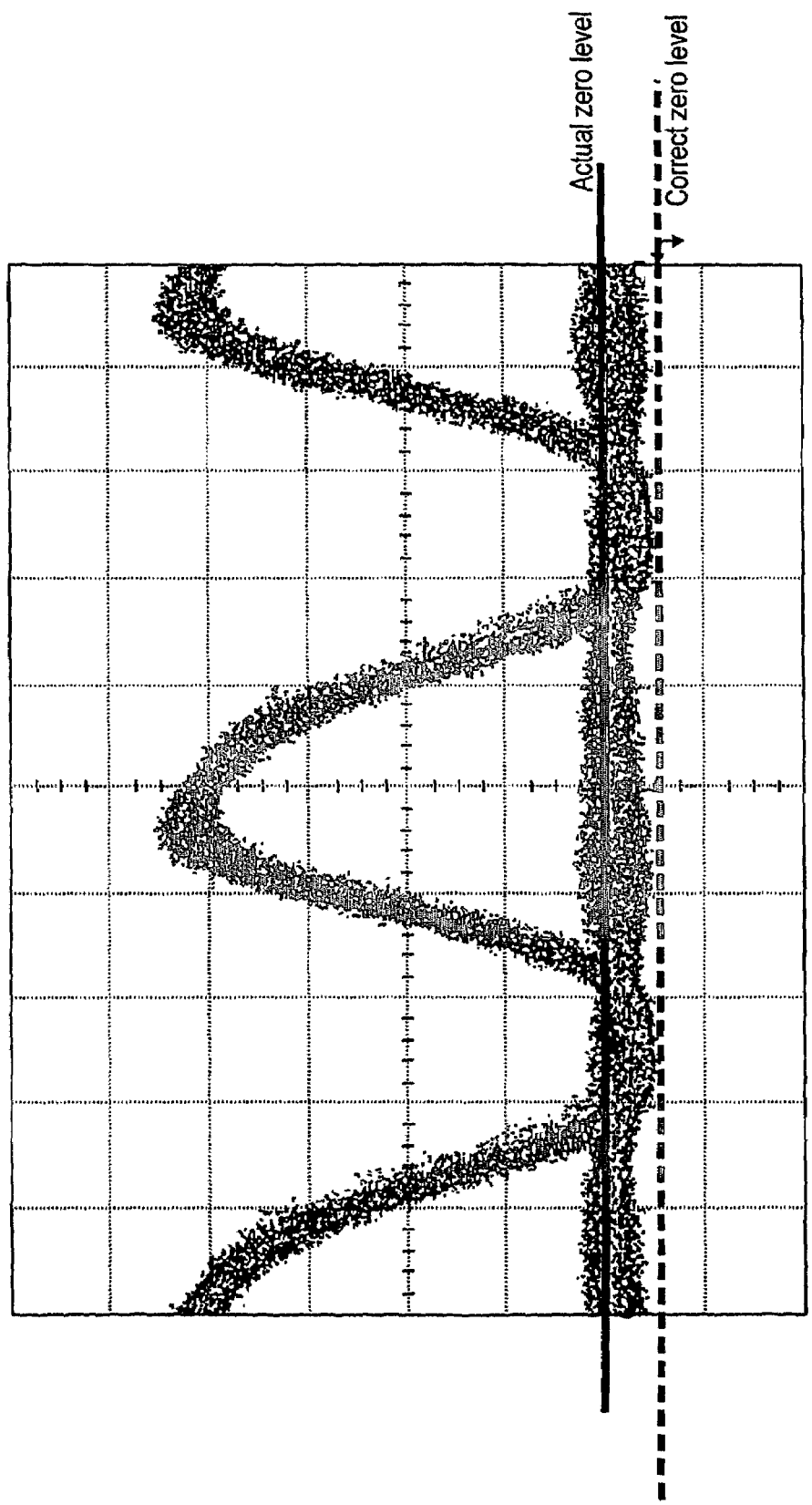
Figure 15:
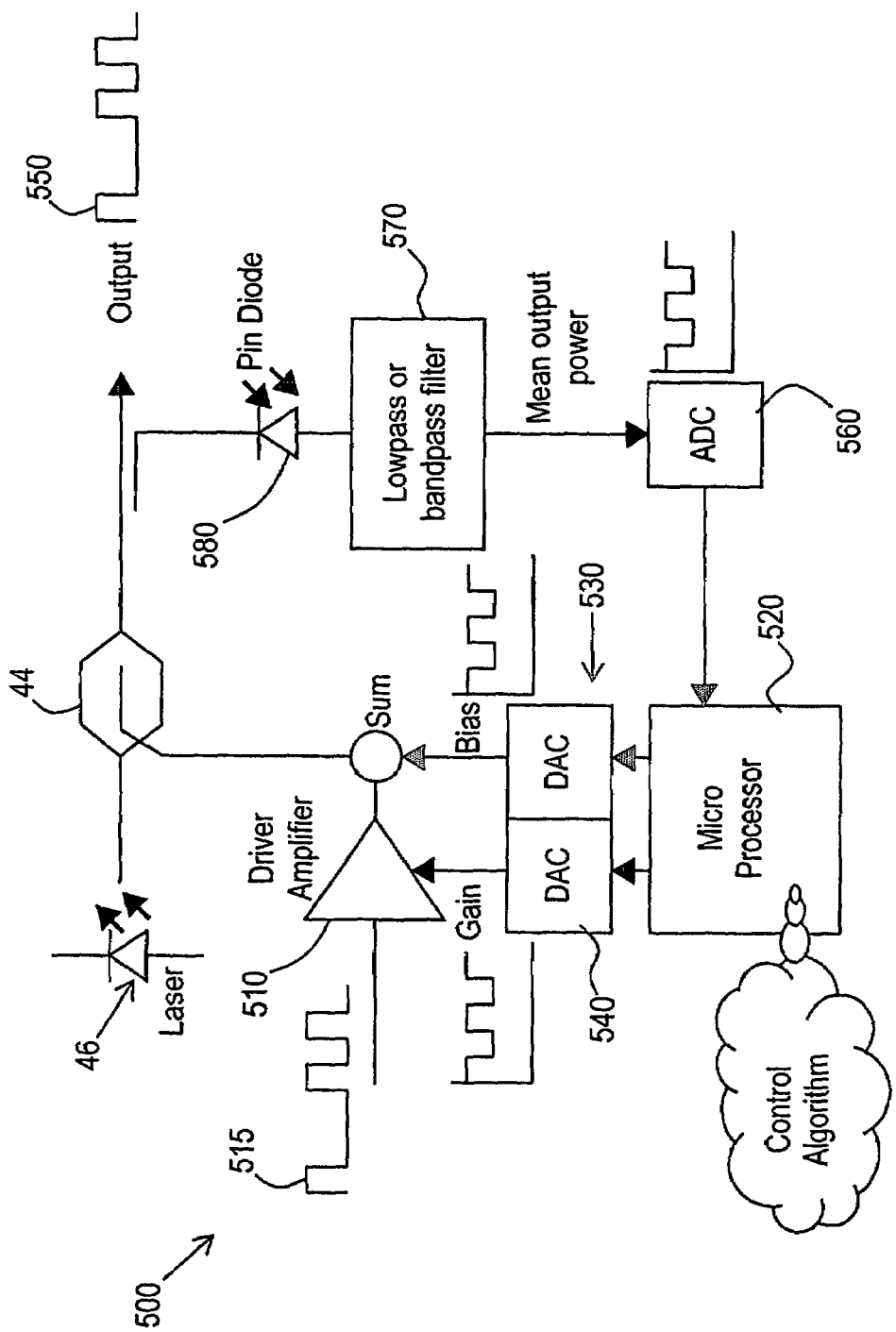
Figure 16:
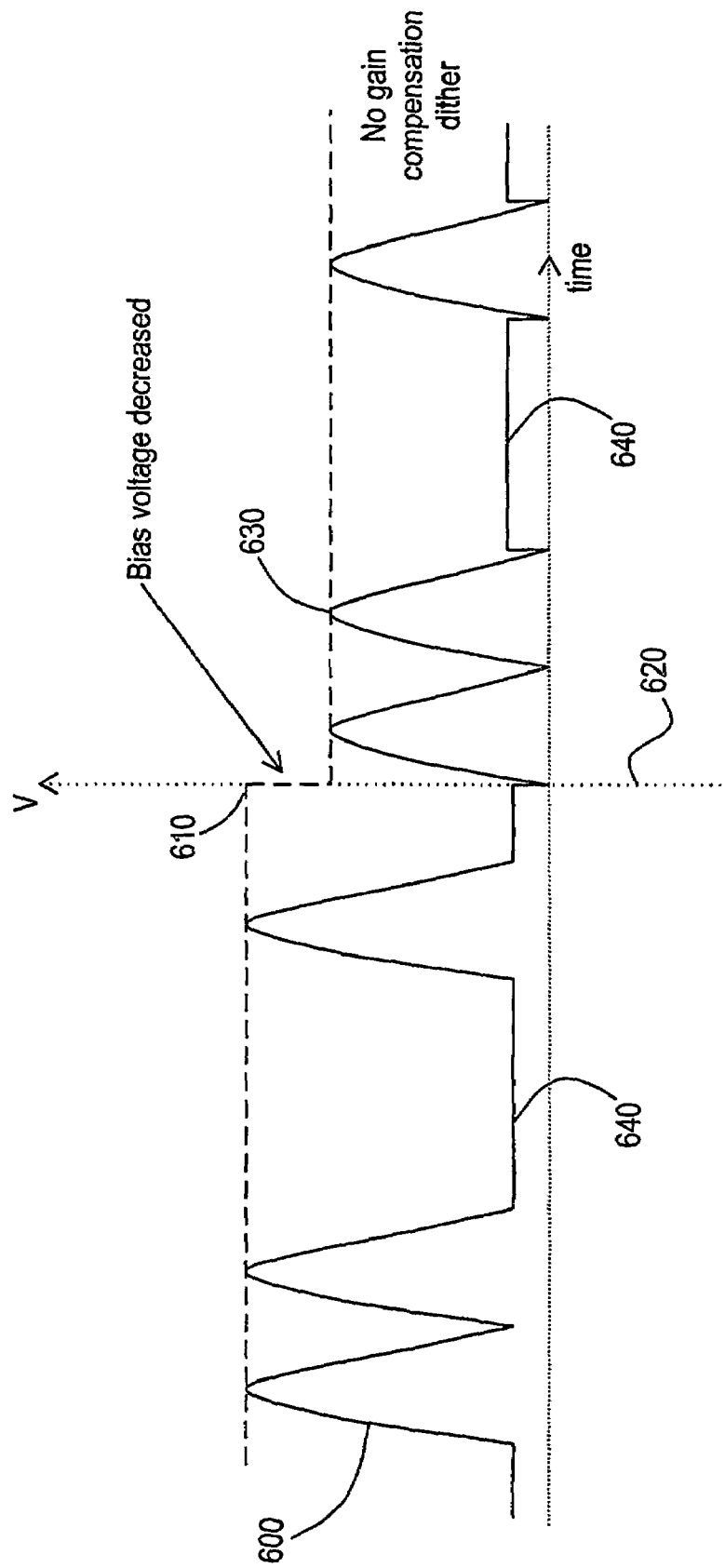
Figure 17:
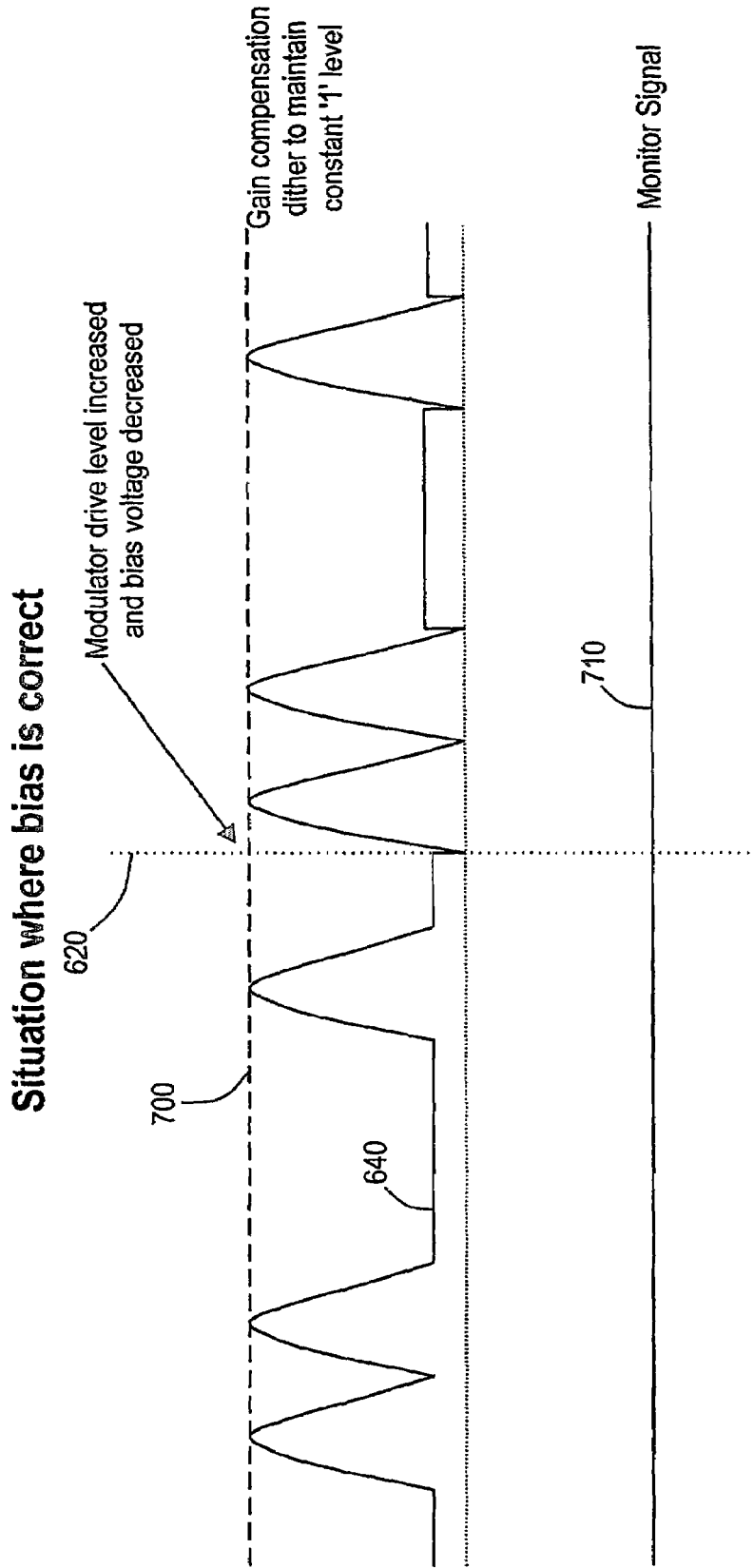
Figure 18:
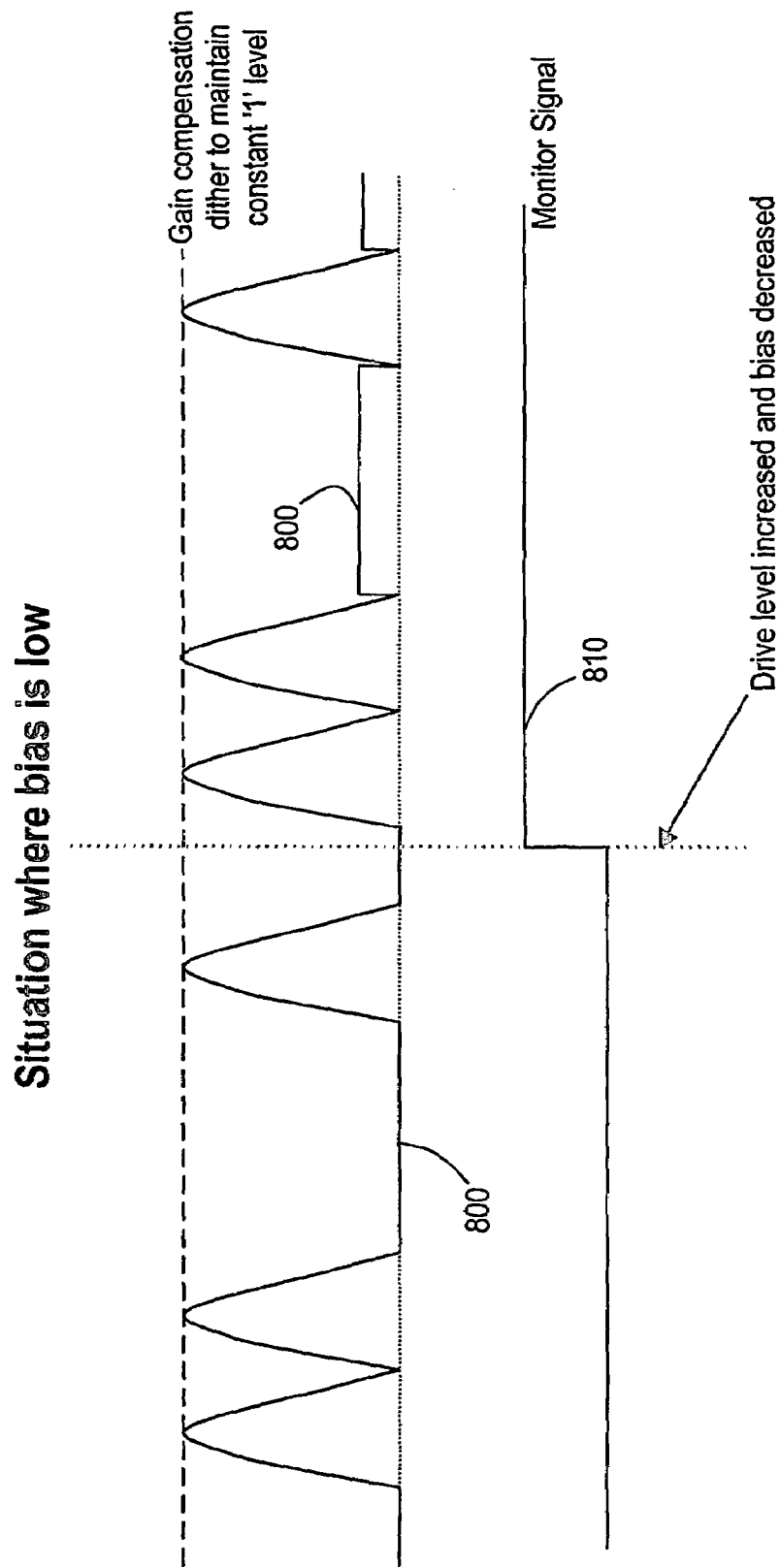
Figure 19:
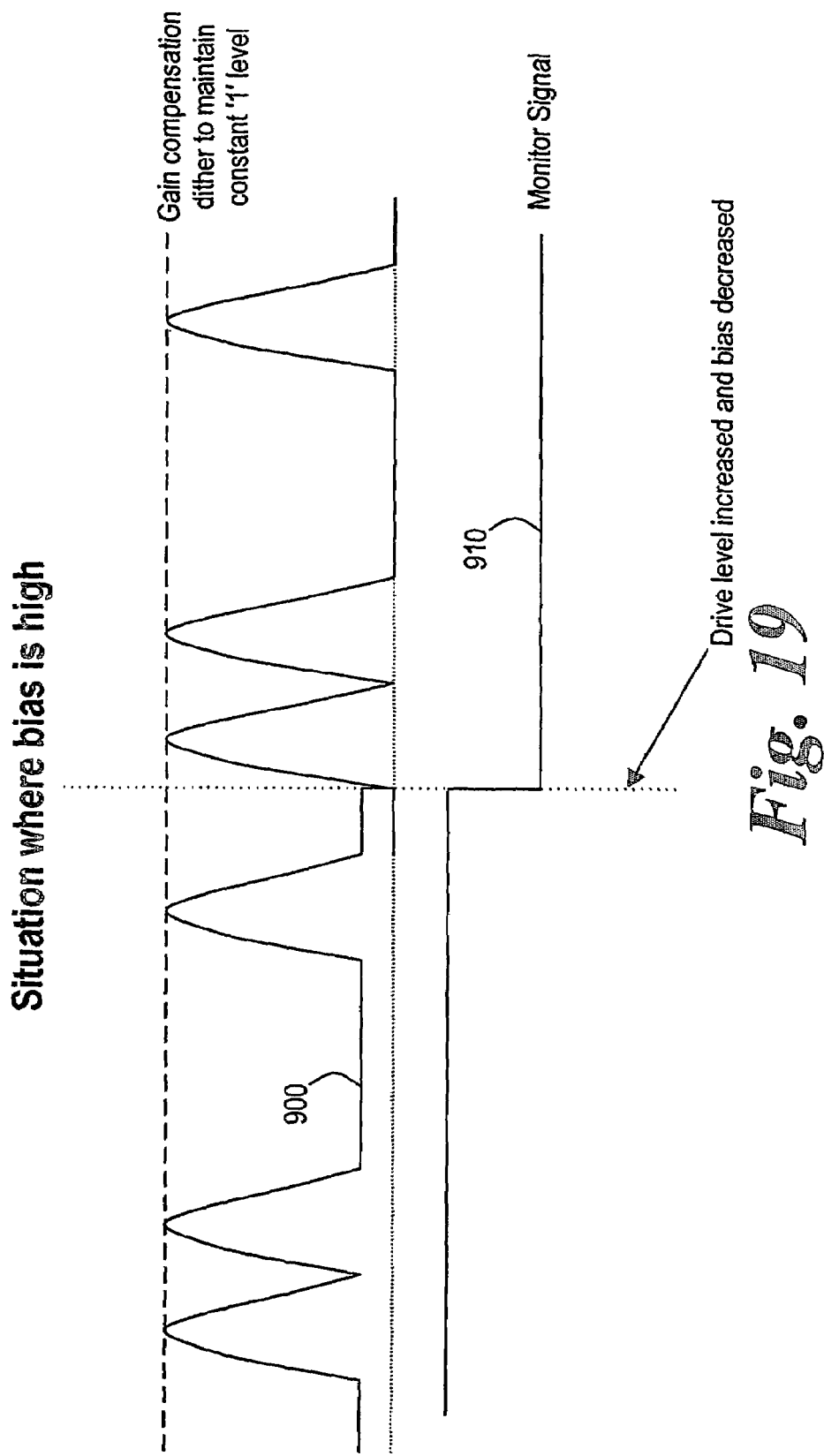
Figure 20:
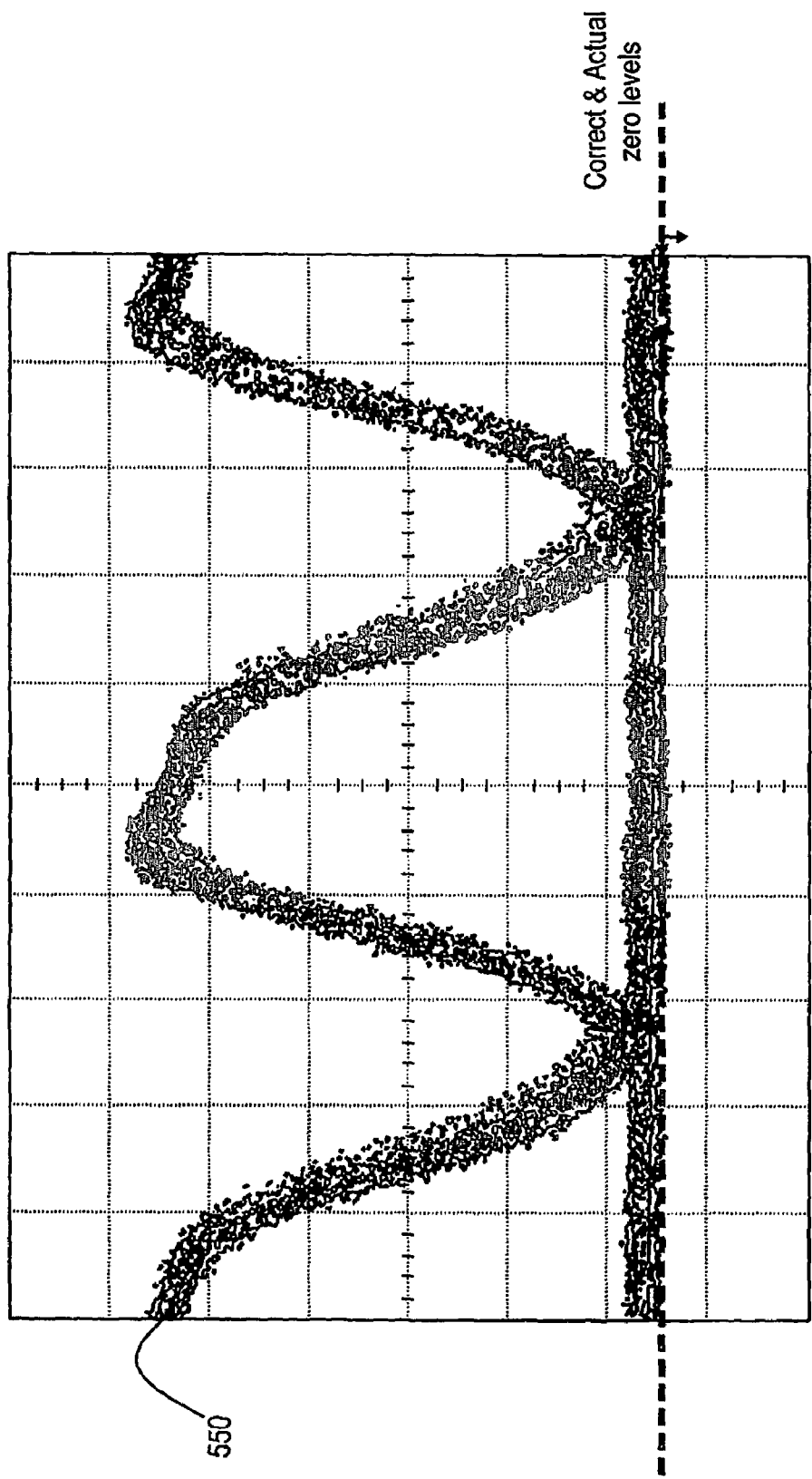

FIGS. 10, 11, 12, and 13 are schematic representations showing mean power output from a MZM versus the bias voltage applied to the MZM;

FIG. 14 shows a measured data eye for electrically generated RZ using a known control system;

FIG. 15 is a schematic representation of a control loop forming part of a communications system according to the present invention;

FIG. 16 is a schematic representation showing modulator output when bias voltage is decreased;

FIG. 17 is a schematic representation showing how modulator drive level is increased as the bias voltage is decreased for a situation where the bias voltage is at an optimum level;

FIG. 18 shows the RZ data and monitor feedback when the applied bias is too low when gain compensation dither is added, and FIG. 19 shows the RZ data and monitor feedback where the applied bias is too high when gain compensation dither is added;

FIG. 20 shows a measured data eye for a communication system according to the present invention.

Figure 3:
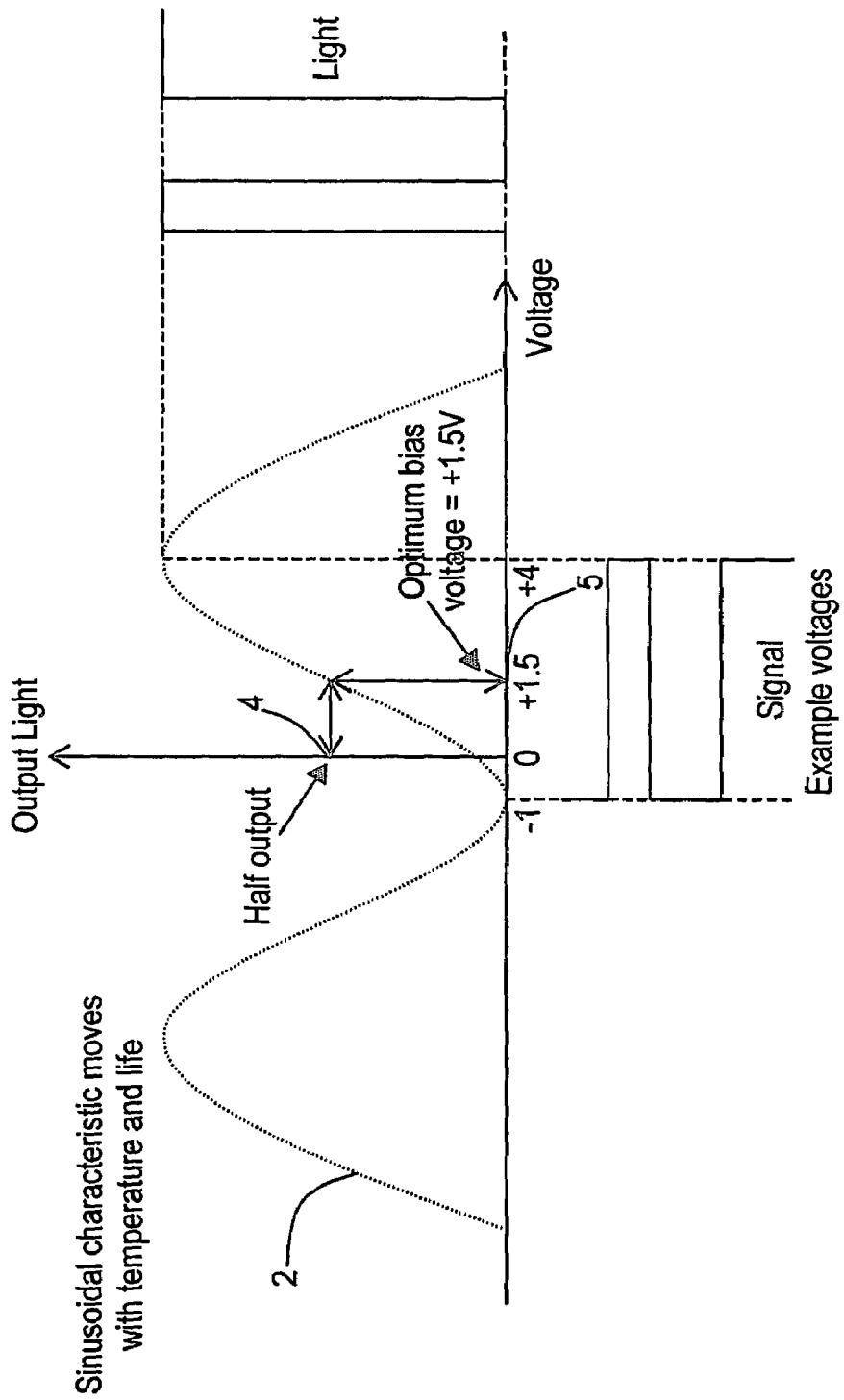
FIG. 3 is a schematic representation showing the output from a Mach-Zehnder interferometer acting as a Mach-Zehnder modulator (MZM)

Referring now to the figures, and initially to FIG. 3, the transfer function of a Mach-Zehnder interferometer is shown (optical output power versus bias voltage is shown). As can be seen the output is in the form of a sinusoidal wave 2. In the example shown, the half wave output is indicated by reference numeral 4, and the optimum bias voltage 5 to be applied to the Mach-Zehnder modulator is in this case +1.5 volts.

Figure 6:
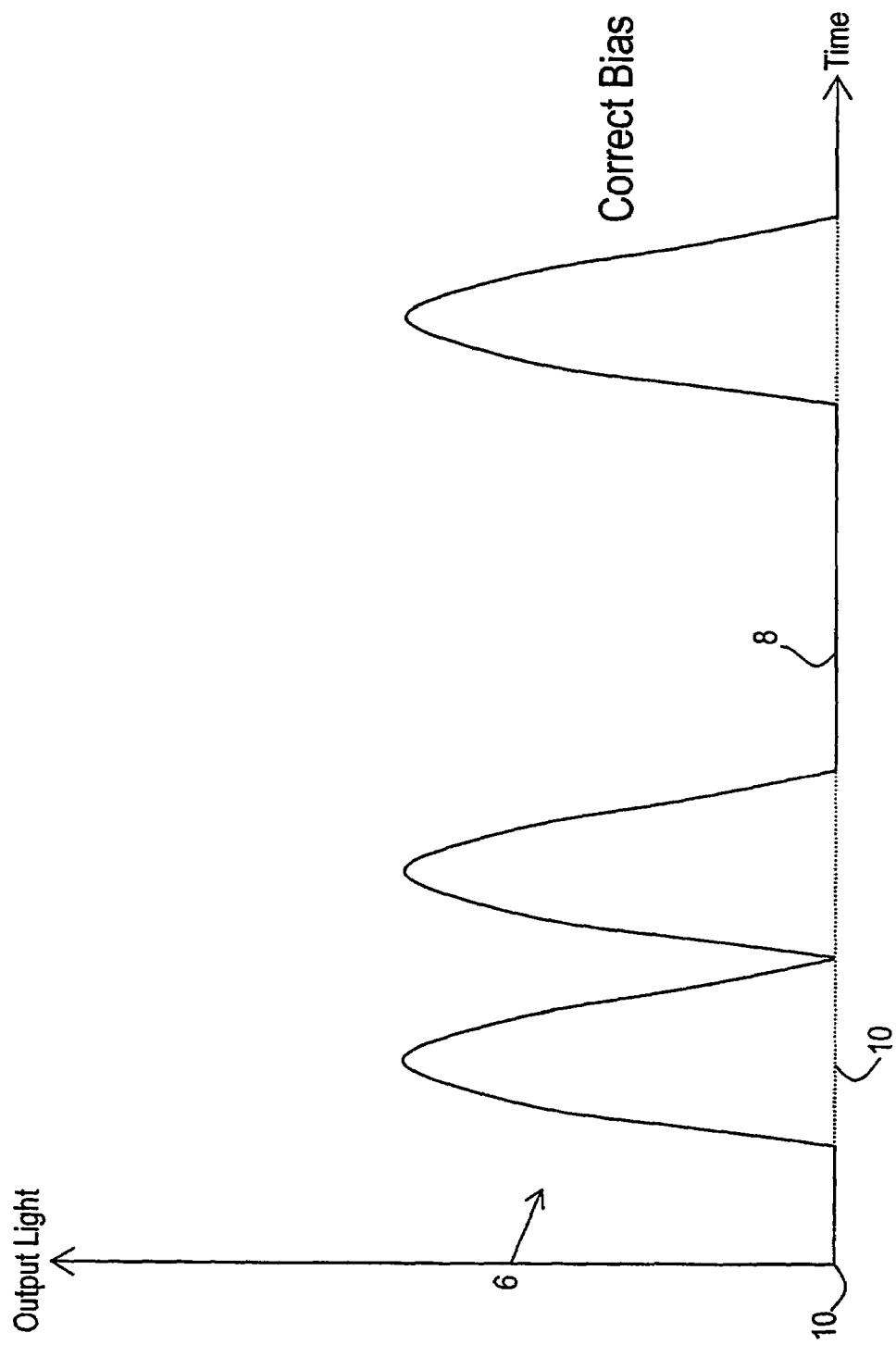
FIGS. 6, 7 and 8 show the effect on a Mach-Zehnder modulator of a bias voltage applied to the output of the MZM.
Figure 7:
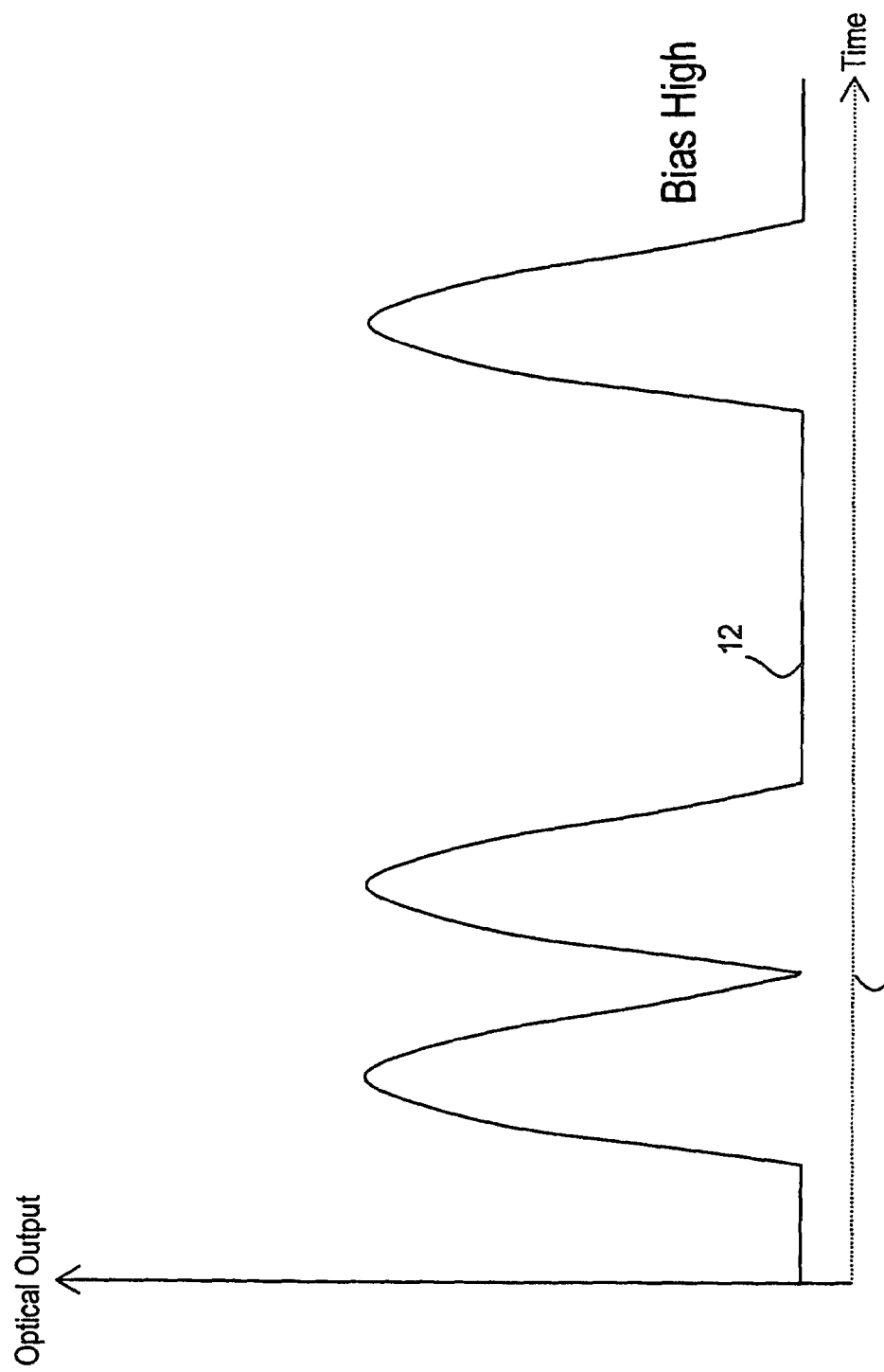
Figure 8:
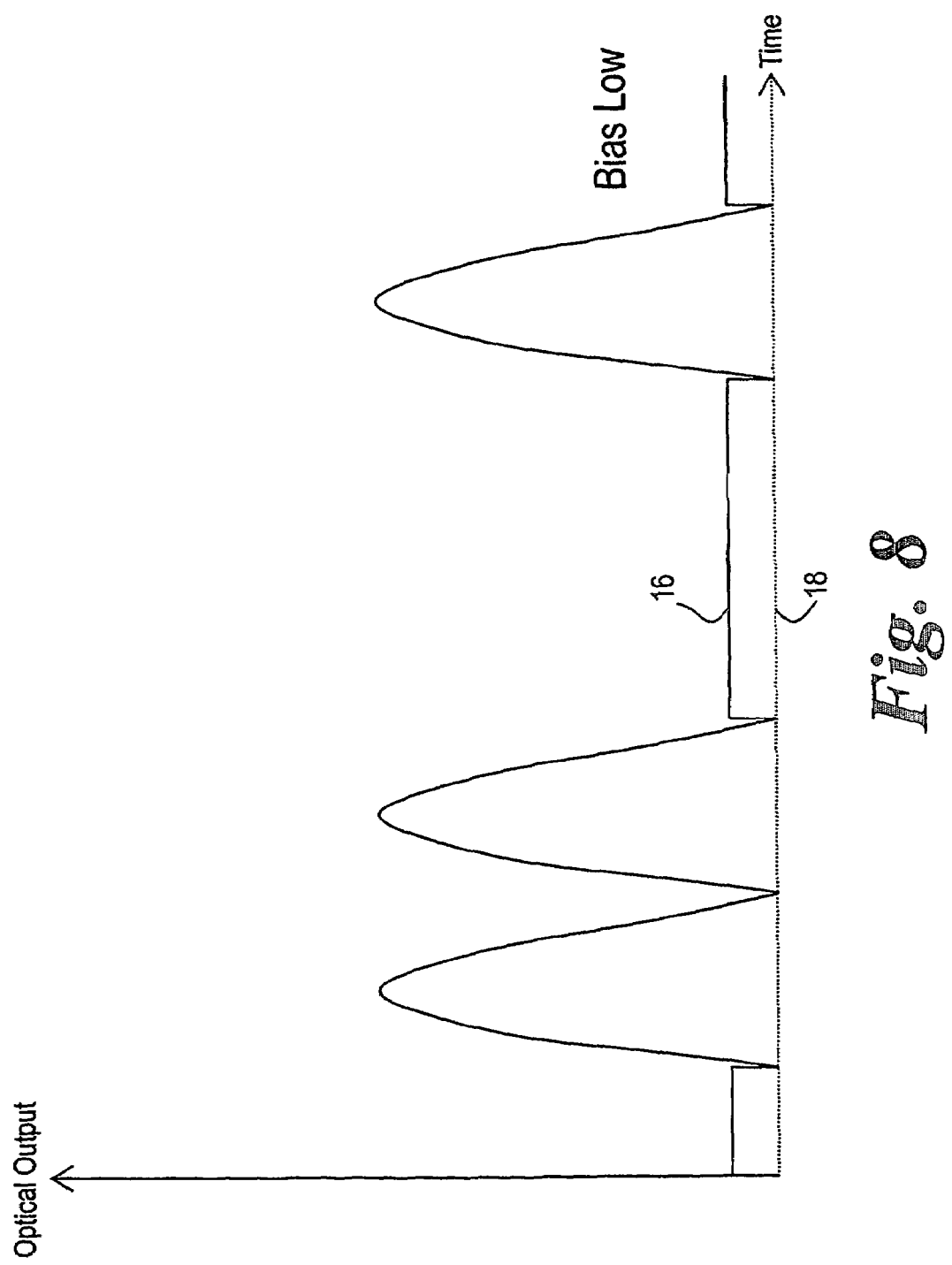

Turning to FIGS. 6, 7 and 8, the return to zero wave form output from a Mach-Zehnder modulator is shown. In each figure, the magnitude of output light is shown on the horizontal axis, and voltage is shown along the vertical axis. The units used are arbitrary.

FIG. 6 shows the data output 6 when the bias voltage is applied at an optimum level. It can be seen that the zero value signals 8 corresponds with actual zero 10.

In FIG. 7, the applied bias voltage is too high, and the zero signal 12 has a positive value relative to actual zero 14. In FIG. 8, the applied bias voltage is too low, and the zero value signal 16 also has a positive value compared to actual zero 18 due to the foldover of the MZM characteristic.

Figure 9:
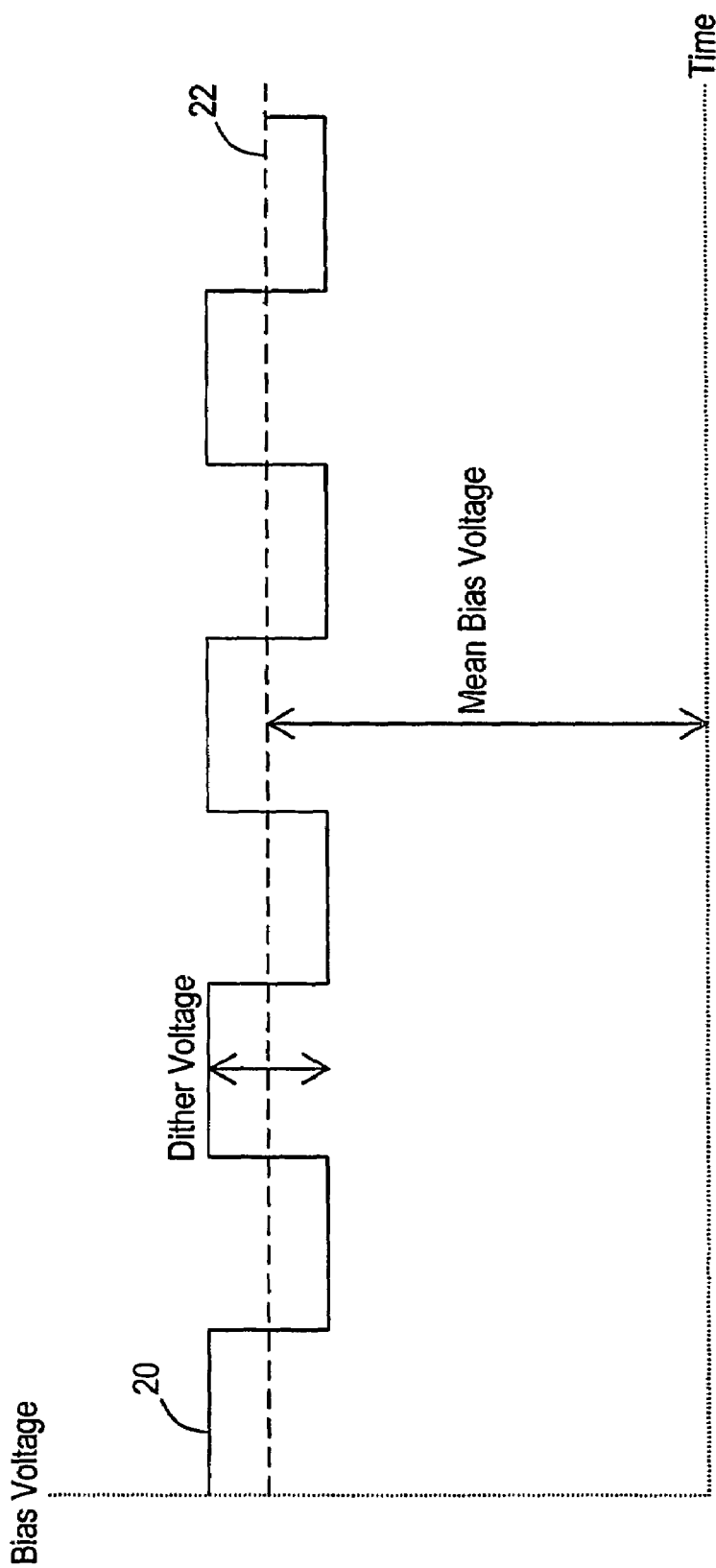
FIG. 9 is the schematic representation showing a bias voltage applied to a MZM with a dither applied to the bias voltage.

In order to vary the bias voltage applied to the modulator, a dither voltage 20 is applied to the bias voltage as shown in FIG. 9. This gives an output as shown in FIG. 8. The mean bias voltage is indicated by dotted line 22.

Figure 10:
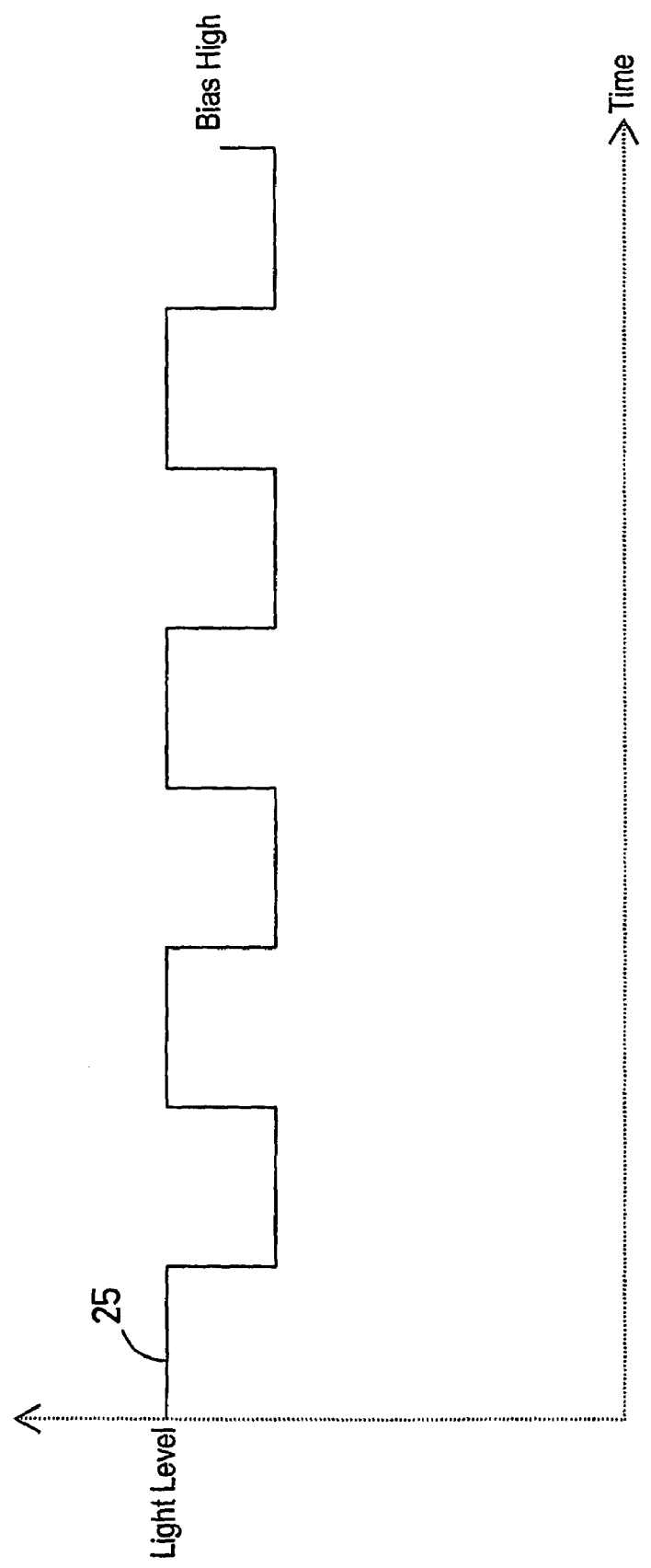
Figure 11:
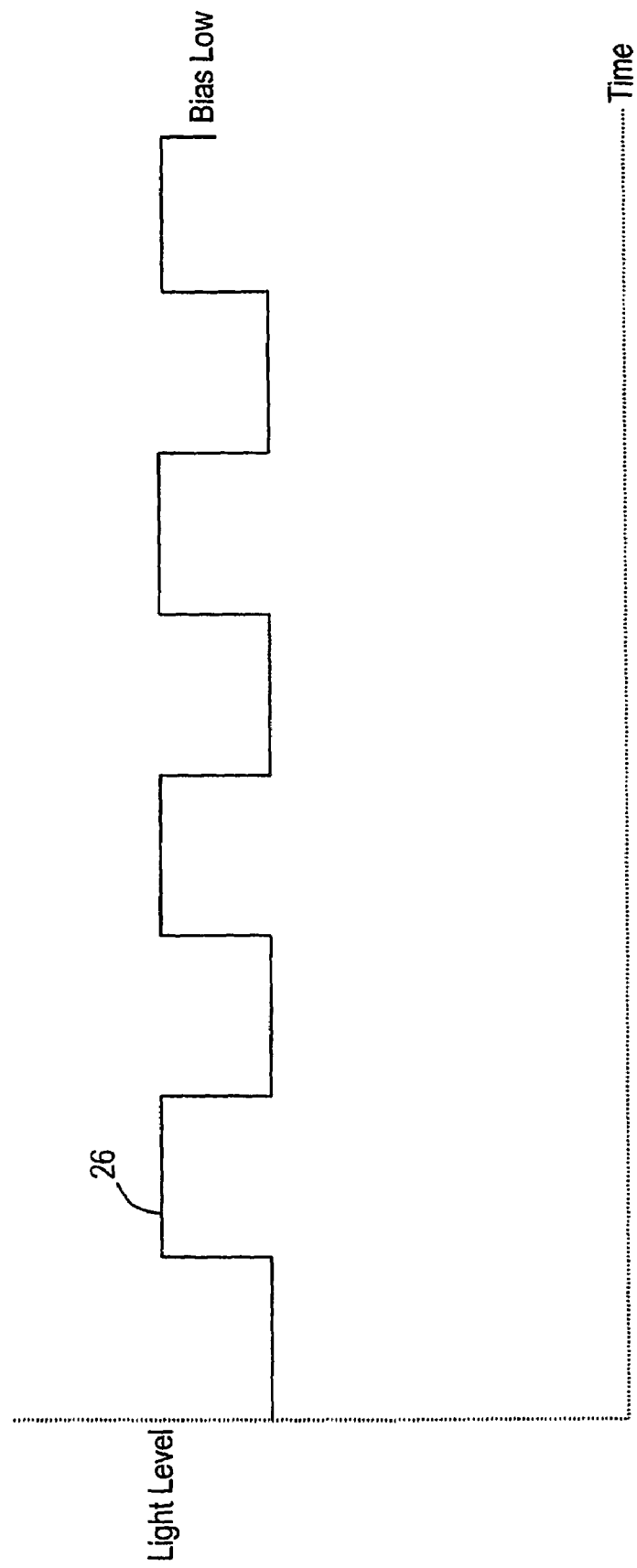
Figure 12:
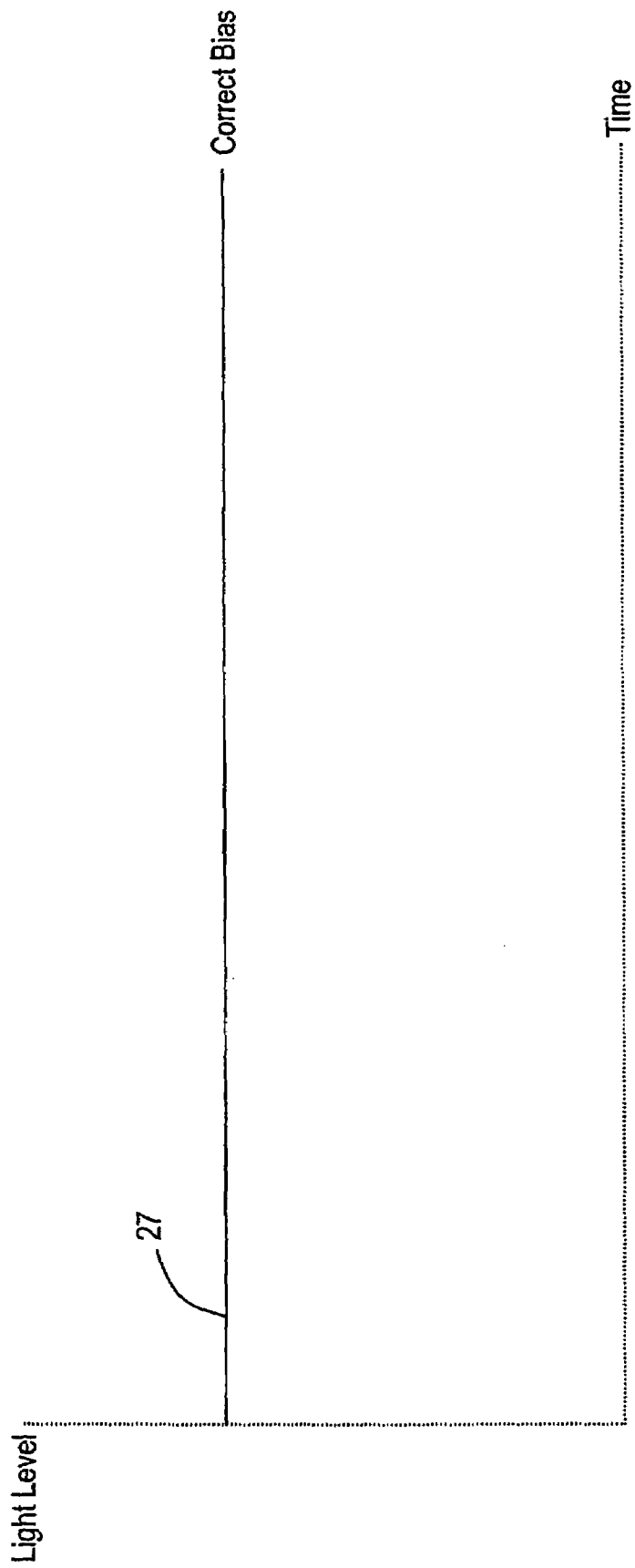

Referring to FIGS. 10, 11, 12 and 13, it can be seen how the mean light output power (or light level) from the Mach-Zehnder modulator varies with the bias voltage applied to the modulator. FIG. 10 shows how the light output power 25 varies with a high bias voltage; FIG. 11 shows how the light output power 26 varies with a low bias voltage and FIG. 12 shows how the light output power 27 is substantially constant with a correct bias voltage.

Figure 13:
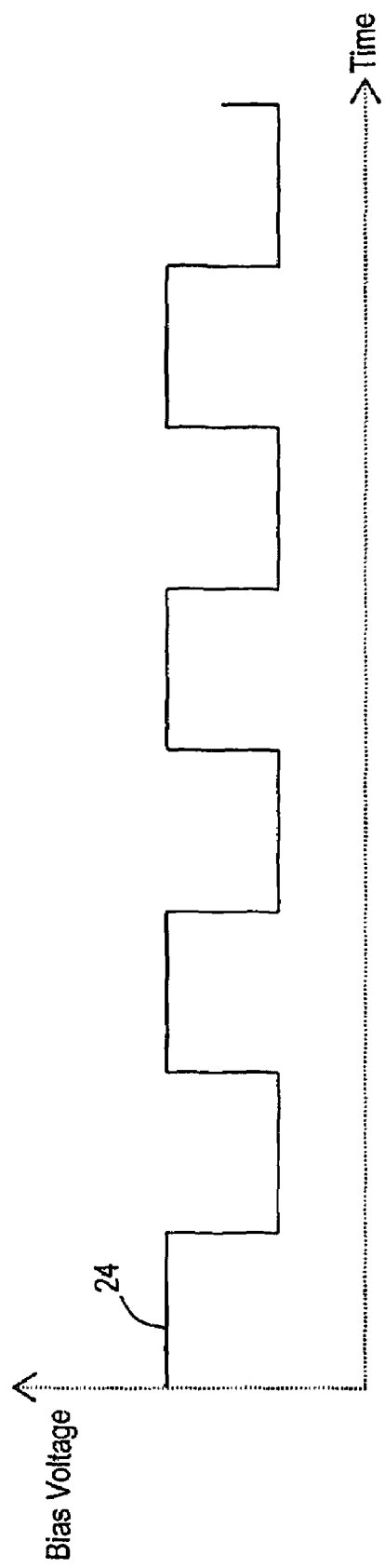

FIG. 13 shows how the bias voltage 24 varies in accordance with the dither voltage 20. As can be seen from FIG. 10, when the applied bias is too high, the output from the MZM varies in phase with the variation in the applied bias voltage 24.

FIG. 12 shows that when the applied bias voltage is at an optimum level, the output from the Mach-Zehnder modulator is substantially unchanged. When the applied bias is too low (FIG. 11), the output from the MZM varies inversely with the variation of the bias voltage as shown by wave form 27.

Figure 5:
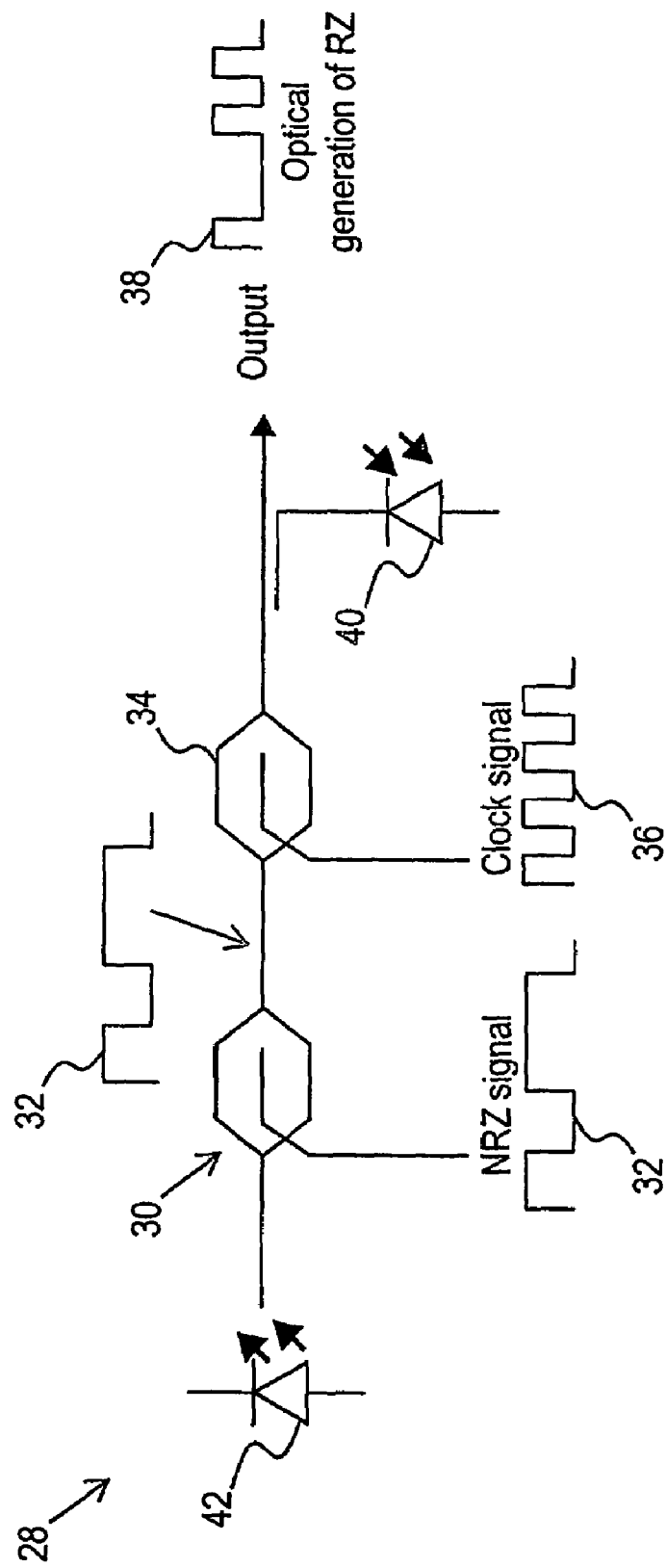
FIG. 5 is a schematic representation showing a known system of producing return to zero signals in an optical communication system (known as optically generated RZ)

Turning now to FIG. 5, a modulator system for use in a known optical communication system is designated generally by the reference numeral 28. The system comprises a first Mach-Zehnder modulator 30 which produces a non return to zero signal 32, and a second Mach-Zehnder modulator 34 to which is applied a clock signal 36. The output from the second Mach-Zehnder modulator is a return to zero optical signal 38. The output can be monitored by a monitor photodiode 40. The system is powered by a laser 42.

The invention will now be further described with particular reference to FIGS. 1, 2 and 15 to 19.

Figure 1:
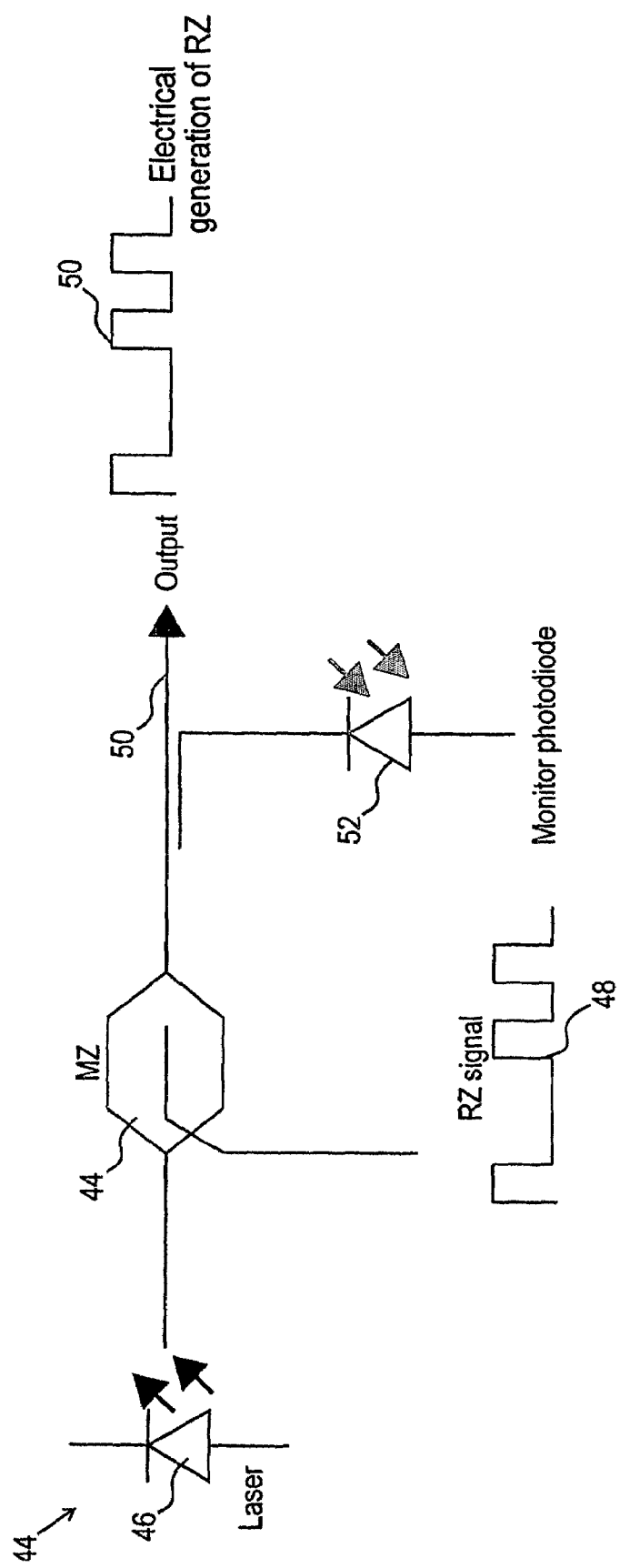
FIGS. 1 and 2 are schematic representations of a known Mach-Zehnder modulator for the electrical generation of RZ.
Figure 2:
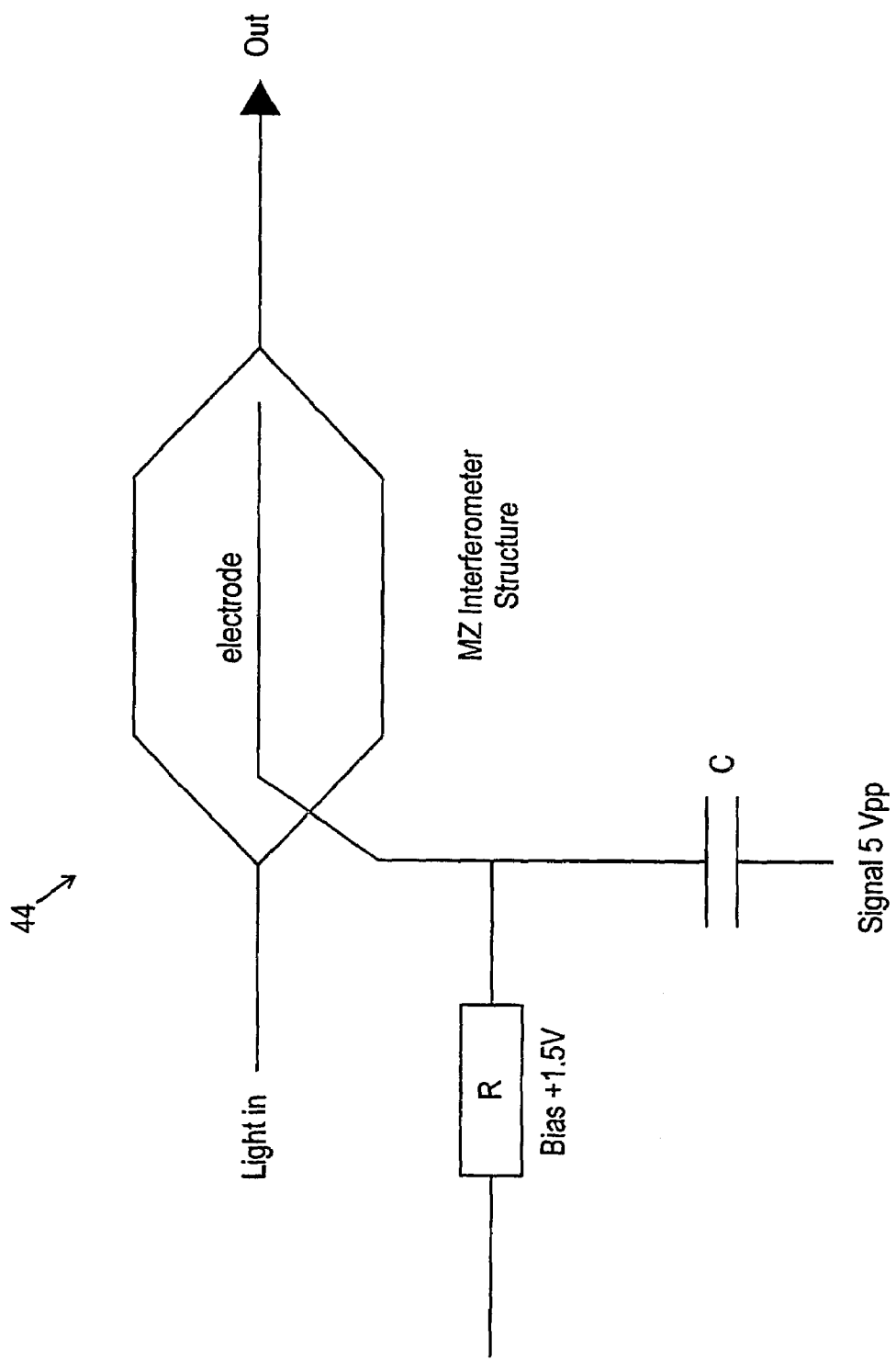

FIGS. 1 and 2 show a known modulator suitable for forming part of system according to the present invention is designated generally by the reference numeral 44. The structure of the Mach-Zehnder interferometer 44 is shown in more detail in FIG. 2. The Mach-Zehnder interferometer comprises a light input 122, a light output 124, a bias resistance 126 and capacitor 128. The modulator is driven by a laser 46. The MZM 44 modulates a data signal in the form of a return to zero (RZ) signal 48. The output 50 is in the form of an RZ signal which has been generated electrically. The output may be monitored by monitor photodiode 52.

Figure 4:
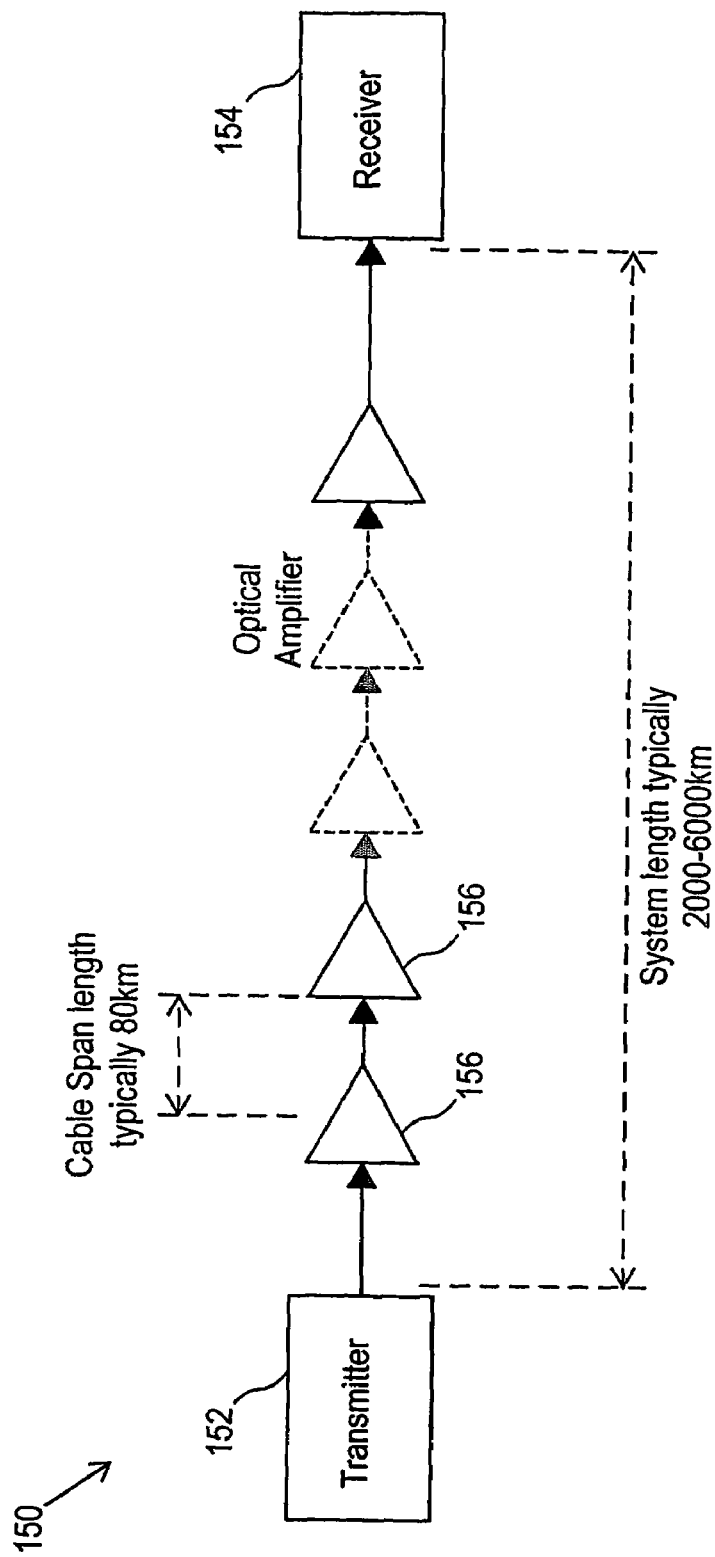
FIG. 4 is a schematic representation of a known optical transmission system.

Referring to FIG. 15, a system according to the present invention is designated generally by the reference numeral 500. The control system 500 may form part of an optical transmission system of the type shown in FIG. 4.

According to the present invention, the laser 46 provides a continuous wave light signal at the input of the modulator 44. A gain controlled drive amplifier 510, amplifies an RZ data signal 515 to a predetermined level for connection to the MZ modulator 44. A microprocessor 520, and a digital-to-analogue convertor (DAC) 530 apply a dither voltage superimposed on a bias voltage in order that the bias voltage fluctuates about a predetermined mean voltage by a predetermined amount.

If it is observed that an increase in the bias voltage increases the one level and the zero level signals by the same amount, this shows that the bias is too high, and the adjustment means reduces the value of the mean bias voltage. Similarly if an increase in bias voltage increases the one level but decreases the zero level signals this shows that the applied bias voltage is too low. The microprocessor then adjusts the bias voltage to increase the mean bias voltage.

The system according to the present invention further comprises varying means (520, 540) for varying the modulator drive voltage in response to adjustments made to the bias voltage. In particular, when the bias voltage is increased, the modulator drive voltage is decreased to maintain the one level signal at a substantially constant level. Similarly when the bias voltage is decreased, the modulator drive voltage is increased to maintain the one level signals substantially constant.

As a result, the average light level output from the Mach-Zehnder modulator is related to the zero level signal only and not to the one level signal when the bias is adjusted. This results in a stable system. In addition the extinction ratio 550 is better than 16 dB as shown in FIG. 20.

The system 500 comprises typically a 10 Gb/s optical transmitter. The signal laser 46 acts as an optical source and is gated by the MZ modulator 44. The driving data signal to the MZ is RZ in nature, and is amplified in level by a driver amplifier 510 to typically 5 Volts peak to peak. In addition the bias voltage is summed with the amplifier drive output in order to bias the MZ modulator at the correct operating point. A tap monitor point at the output of the MZ is coupled to a Pin diode 580 to act as a feedback for the bias control loop. When correctly biased, the system described will emit an RZ-like optical waveform.

To control the bias point to the correct operating point the micro-processor 520 is used with an embedded control algorithm. The processor is interfaced to control the transmitter via two digital to analogue convertors (DAC's) 530, 540, one controlling driver amplifier gain and thus the output drive level, and the other controlling MZ bias voltage and thus the operating point.

The processor 520 is interfaced to the transmitter output signal 550 with an input analogue to digital convertor (ADC) 560 which samples the effective mean (average) output power. This input signal is initially filtered by a lowpass or bandpass filter 570 with characteristics chosen to pass the detected dither signal and reject noise associated with the pseudo random RZ 10 Gb/s data. The detected signal may be further filtered by an embedded digital signal processing (DSP) algorithm contained within the software program.

Thus, by means of the present invention, the MZ bias voltage can be controlled for optimum output signal quality. For clarity, signal representations have been added to the diagram to indicate either RZ data, dither voltage on top of a gain control voltage, dither voltage on top of a bias voltage, detected dither voltage on top of a measured output signal voltage, and transmitter output RZ signal.

FIGS. 16 to 19 further illustrate the use of dither according to the present invention. FIG. 16 is a representation of an RZ signal 600 with a reduction of MZ bias voltage 610 at a particular time 620. In this situation no gain compensation dither has been added, so it can be seen that the peaks 630 of the RZ signal are reduced in magnitude after the bias voltage is decreased, and the zero level 640 folds over to effectively leave the zero level substantially unchanged.

In FIG. 17, in addition to the reduction in bias voltage at the particular time 620, the modulator drive is simultaneously increased where the levels are arranged such that the output one level remains substantially unchanged. In this situation the bias voltage 700 is appropriate for an optimum extinction ratio, so it will be seen that the zero level 640 folds over and remains constant. As such, the detected monitor signal 710 (which is a lowpass or bandpass filtered version of the transmitter output), remains at a constant level.

To illustrate how the control loop provides feedback in case of bias error, FIG. 18 is arranged for a slightly below optimum bias voltage. When the drive level is increased and bias voltage decreased, and the data ones remain unchanged as before. However, the foldover on the zero level 800 is more marked and there is a change in zero level. This change is manifested as an increase in optical power on the monitor signal 810.

The opposite is the case in FIG. 19, where the bias voltage is slightly above the optimum. This leads again to no change in the data one level, but a decrease in the power on the zero level 900. As such a decrease in power is seen on the monitor signal 910.

The micro-processor algorithm is arranged to either increase or decrease bias voltage such that no change in monitor signal power is noted when a complementary dither signal is added to the bias and drive signals. In particular it is arranged to decrease bias voltage if a fall in signal power is observed for a simultaneous increase in drive level and decrease in bias level. It is arranged to increase bias voltage if an increase in signal power is observed for a simultaneous increase in drive level and decrease in bias level. To be complete, the complementary situations are also enforced, whereby bias is decreased for an increase in monitor signal, with drive decreased and bias increased, and also bias is increased for a decrease in monitor signal, with drive decreased and bias increased.

In summary there are four situations for which the algorithm caters, with an aim to achieve zero change in the monitor signal by constant adjustment of the MZ bias voltage.

The invention claimed is:

1. An optical communications system comprising:
   an optical input and an output,
   a source of input signals in an asymmetric format and having a duty cycle,
   a modulator for modulating the input signals, to produce an asymmetric signal, the modulator comprising a Mach-Zehnder interferometer;
   drive means for driving the modulator at a predetermined modulator drive voltage;
   bias means for applying a bias voltage to the modulator;
   adjustment means for adjusting a first variable chosen from one of the bias voltage, gain voltage, or duty cycle in response to the relationship existing between changes in the amplitude of the asymmetric signal and changes in the first variable, characterised in that the system further comprising varying means for varying a second variable, different to the first variable and chosen from one of the bias voltage, gain voltage or duty cycle in response to adjustments made to the first variable; and
   a monitor for recording the average optical output power.

2. A communication system according to claim 1 wherein the first variable comprises the bias voltage, and the second variable comprises the gain voltage.

3. A system according to claim 2 wherein the adjustment means comprises a first dither for applying a dither to the bias voltage.

4. A system according to any one of the preceding claims wherein the adjustment means increases the bias voltage if the output decreases when the bias voltage is increased, and decreases the bias voltage if the output, increases when the bias voltage increases.

5. A system according to any one of claims 1 to 3 wherein the varying means increases the modulator drive voltage when the bias voltage increases, and decreases the modulator drive voltage when the bias voltage decreases.

6. A system according to any one of claims 1 to 3 wherein the adjustment means decreases the bias voltage if the output decreases when the bias voltage is increased, and increases the bias voltage if the output increases when the bias voltage increases.

7. A system according to any one of claims 1 to 3 wherein the varying means decreases the modular drive voltage when the bias voltage increases, and increases the modular drive voltage when the bias voltage decreases.

8. A system according to any one of claims 1 to 3 wherein the varying means comprises a second dither for applying a dither to the modulator drive voltage.

9. A method of transmitting an optical signal in asymmetric format, the method comprising modulating an input signal having an asymmetric format and a duty cycle using a Mach-Zehnder modulator (MZM);

applying a predetermined modular drive voltage to the MZM;

applying a bias voltage to the MZM;

adjusting a first variable chosen from one of the bias voltage, gain voltage, or duty cycle in response to the relationship existing between changes in the amplitude of the asymmetric signal and changes in the first variable;

varying a second variable, different to the first variable and chosen from one of the bias voltage, gain voltage or duty cycle in response to adjustments made to the first variable;

monitoring the average optical power output of the Mach-Zehnder modulator.

10. A modulator comprising a Mach-Zehnder interferometer, which modulator produces asymmetric signals in an optical communication system.

* * * * *